Jan. 16, 1934.     I. STIDD     1,944,141
CONNECTER
Filed March 29, 1933
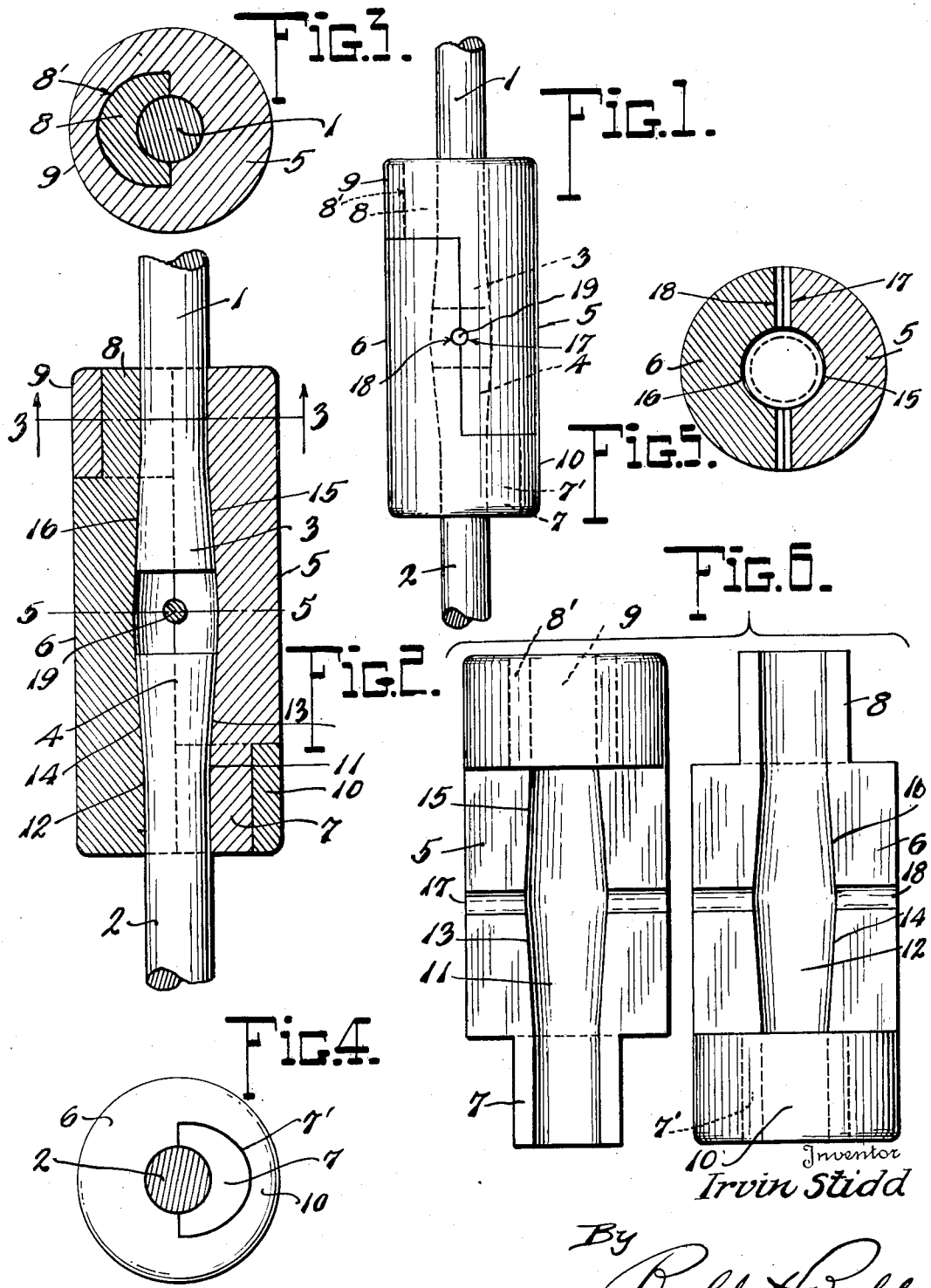
Inventor
Irvin Stidd
By Robb & Robb
Attorneys Patented Jan. 16, 1934

1,944,141

UNITED STATES PATENT OFFICE 1,944,141

CONNECTER

Irvin Stidd, Mount Jewett, Pa., assignor of one-half to Samuel C. Beers, Mount Jewett, Pa.

Application March 29, 1933. Serial No. 663,408

4 Claims. (Cl. 287—108)

The present invention appertains to connecter or coupling devices for use in connecting rods, shafts, pipes, ropes, cables, etc., together, the principal object of which resides in the simplicity of construction and ease of application of the connecter for coupling purposes.

It is a further object of the invention to provide a connecter device wherein screws, bolts, latches, and other auxiliary parts are eliminated, thereby reducing the cost of construction and reducing the time and labor required for the assembly and disassembly of the connecter.

A further object of the invention is to provide a connecter which is of the constant strain type, that is, the parts connected together by the connecter, such as rods, ropes, and the like, being under substantially constant strain or stress.

Another object of the invention is the provision of a connecter as above mentioned wherein the stress or strain on the parts connected by the connecter is utilized to lock the connecter in operative or connecting position.

The invention further contemplates the provision of a pair of substantially duplicate complemental connecter sections having inter-engaging parts adapted to prevent lateral separation of the sections, the sections having grooves formed in the contiguous faces for the reception of the members to be connected together, the grooves being formed in such a manner to cooperate with enlargements on the adjoining ends of the members to be connected together so as to exert a lateral pressure on the complemental sections in a direction normally tending to separate the same, and this lateral pressure being utilized to cause the inter-engaging parts of the sections to be firmly held together.

A still further object of the invention is to provide a connecter wherein the greater the force tending to pull the connected members apart, the firmer will be the connection afforded by the connecter.

Other and further objects and advantages of the invention will be hereinafter set forth and the novel features thereof defined by the appended claims.

In the drawing:

Fig. 1 is a view in elevation of a connecter embodying the principles of my invention;

Fig. 2 is a longitudinal sectional view of the connecter as shown in Fig. 1;

Fig. 3 is a sectional view taken substantially on the plane indicated by the lines 3—3 of Fig. 2;

Fig. 4 is an end view of the connecter;

Fig. 5 is a sectional view taken approximately on a plane indicated by the lines 5—5 of Fig. 2, and Fig. 6 is a separated or exploded view of the connecter showing the complemental sections in elevation.

Like reference characters denote corresponding parts in the several figures of the drawing wherein 1 and 2 designate the members which are to be connected together such members being shown as rods. It is to be understood, however, that the use of my connecter is not to be restricted to the connection of rods, since it will be apparent that rods, cables, pipes and the like may be connected together in the same manner. The ends of the rods 1 and 2 are shown with an upset portion 3 and 4 or an enlargement forming connecter engaging parts as will hereinafter be more fully apparent.

In the case of ropes and cables, these enlargements might be in the form of a knot in the end of the rope or cable, or the ends might be splayed out and speltered in the case of a wire cable or otherwise maintained in a splayed out condition. In the case of pipes, the ends of the pipes might be flared outwardly to produce the enlargement. It is also possible in the case of rods, pipes and the like to employ a detachable enlargement in the form of an ordinary nut threaded onto the end of the same or, if desired, a tapered nut or section having a taper conforming substantially to the taper shown at 3 and 4.

Passing now to the construction of the connecter, it will be observed from Fig. 6 that the same is made up of a pair of substantially duplicate complemental sections generally designated 5 and 6. Each of the sections or halves of the connecter has the form of a body of uniform dimension from one end of which extends the reduced portions 7 and 8 for cooperation with rings or collars 10 and 9, respectively, on the other section or half, the rings or collars having openings 7', 8' therethrough conforming to the shape of the extensions 7 and 8 respectively as will be apparent from Figs. 3 and 4.

Formed in the contiguous faces of the complemental sections are grooves 11 and 12 forming a bore of suitable cross sectional form for the reception of the rods 1 and 2 or other members which are to be connected together by the connecter. These grooves are outwardly tapered for a portion of their length, preferably midway of their ends as at 13, 14, 15 and 16, these tapered portions forming enlargements in the coupling for the reception of the coupling engaging enlargements 3 and 4 on the rods or other members to be connected. It will be observed that the tapers of the grooves in the sections are in the direction of pull on the rods so that any strain on the rods tending to pull the same apart or separate them will more firmly wedge the enlargements in the grooves, thereby exerting a force on the sections when assembled together which would normally tend to separate the sections in a lateral direction. However, by virtue of the inter-engagement of the extension 8 with the collar 9 and the extension 7 with the collar 10, such lateral separation is prevented and the sections become locked together so firmly that longitudinal separation is also prevented.

The operation of the device should be apparent from the foregoing and may be briefly summarized as follows.

The ends of the rods 1 and 2 or other members to be connected are introduced into the grooves of the complemental sections by inserting the ends through the openings 7', 8' and moving the rods so that the enlarged extremities lie in the enlarged portions of the grooves. Referring specifically to the drawing by way of further explanation of this operation, the rod 2 would be inserted through the opening 7' in section 6 and disposed with its end substantially at the center of the section. Similarly rod 1 would be introduced through opening 8' and disposed in the groove with its end approximately at the center of section 5. The complemental sections would then be moved to bring the grooved faces together and longitudinally moved relative to each other to cause extensions 7 and 8 to be introduced into the openings 7', 8', respectively, such movement being in the form of a sliding action of one section on the other in a direction such that the collars 9 and 10 are respectively moved towards each other. The sections in assembled position would assume the position shown in Figs. 1 and 2.

After such assembly, the rods 1 and 2 are then separated or pulled outwardly of the sections to cause the enlarged ends 3 and 4 to be wedged in the tapered portions of the grooves. This wedging action exerts a lateral pressure on the sections in a direction normally tending to laterally separate the same, but since the inter-engagement of extensions 7 and 8 with the collars 10 and 9, respectively, prevents such lateral separation, the parts will be firmly wedged or secured together so that the sections can not be separated by a relative longitudinal movement of the sections.

In order to disconnect the connecter, it is merely necessary to move the rods towards each other so that they will assume a position with their ends abutting or substantially close together, whereupon the sections of the connecter may be longitudinally moved relative to each other in the opposite direction from the direction of assembly (that is by moving the collars away from each other) thereby disengaging the extensions 7 and 8 from the collars 10 and 9, respectively. When the sections have been thus separated, they may be removed entirely from the rods by withdrawing the same from over the ends of the rods.

In the event that the strain on the rods is not constant when the rods are in use, and to avoid any possibility of accidental disconnection of the connecter due to slack in the rods causing the rods to be moved towards each other, it might be desirable to provide the sections with transverse grooves 17 and 18 across their contiguous faces at the center of the sections so that when the sections are assembled the grooves 17 and 18 will be in register to form a transverse aperture through the coupling or connecter into which may be inserted a pin or bolt 19 serving as an auxiliary locking member. This pin or bolt will serve to maintain the rods in a separated or spaced position within the connecter, thus maintaining the wedging action of the enlarged ends of the rods within the grooves. The pin or bolt further serves to prevent longitudinal movement of the sections relative to each other in a direction tending to separate the sections for disconnection even though the wedging action of the enlargements on the rods is not sufficient to hold the sections rigidly together.

The connecter as shown in the drawing and as above described has many uses which will be readily apparent and while its primary function is to afford a connection between members which are normally under stress in a longitudinal direction, it might also be used as a coupling for parts which are under stress in a direction other than longitudinal. An example of this is in the case of shafts for the transmission of torque. When used as a coupling for round shafts, it might be desirable to increase the positive connecting action of the connecter or coupling by the use of splines on the ends of the shafts and forming channels in the grooves of the complemental sections for the reception of the splines. If preferred, the ends of the shafts might be provided with flats, or a given shape other than round, in which event splines would be unnecessary. Of course the tapered construction of the groove and the enlargement of the ends of the shafts will be equally important as when used as an ordinary connecter such as has been described above. The splines or equivalent positive inter-engagement would only be necessary in cases where the power transmitted by the shafts is considerable. For small torque, it is only necessary to maintain the shafts in a separated position with their smooth enlarged ends in firm engagement with the sides of the tapered grooves. The rigidity of such a connection might be further increased in this instance by enlarging the transverse grooves 17 and 18 so that the pin will actually engage the ends of the shafts when separated to a wedging or coupling locking position. If desired, the grooves 17 and 18 and the cooperating pin 19 might be tapered to actually produce a separation of the shafts when the connecter is assembled into coupling position, thus insuring a wedging of the shaft ends within the connecter grooves which receive the shafts.

While the inter-engaging parts of the complemental sections have been shown and described in the form of extensions 7 and 8 and cooperating collars 10 and 9, it is to be understood that I do not wish to be limited to such a construction since it will be apparent that any type of inter-engagement of the parts which would prevent lateral separation of the sections might be employed. A further example of such inter-engagement is a dovetail tongue and groove inter-engagement. It will be apparent that the essential feature of the locking action of the connecter resides in the creation of a lateral pressure on the sections in a direction tending to separate or expand the same, which lateral pressure is resisted by the inter-engagement of the sections, thus producing a locking of the sections together.

It is to be further understood that while the connecter has been shown in the drawing as having a substantially cylindrical form, it might be made in other forms without modifying the principle of the invention. Similarly the connecter might be constructed to accommodate curved members or other irregularly aligned members.

While the specific details of construction have been herein shown and described, the invention is not confined thereto as alterations may be made without departing from the spirit thereof as defined by the appended claims.

Having thus described my invention what I claim as new and desire to secure by Letters Patent is:

1. In combination with members adapted to be connected together, said members having connecter engaging parts, a connecter for connecting said members together comprising complemental separable sections having grooved contiguous faces for the reception of said members in said grooves, each of said sections further having an integral collar portion at one end in which to receive the end of the other section, thereby forming inter-engaging parts preventing lateral separation of said sections when assembled, the grooves in said sections cooperating with the aforesaid connecter engaging parts of said members and having the construction that lateral pressure will be exerted on said sections incident to the separation of said members, said lateral pressure serving to lock said sections together in coupling position, and an instrumentality for maintaining said members in separated position, and comprising a member extending transversely of said connecter at the line of separation of said sections and intermediate the ends of said members aforesaid, said transverse member serving as an auxiliary locking means for said connecter.

2. A connecter comprising a pair of separable complemental sections each having a groove extending longitudinally of the section in the contiguous face thereof forming a bore through the connecter for the reception of members to be joined together by assembly of the said sections on the extremities of said members, each of said sections further having a reduced extension at one end and a collar at the opposite end, the reduced extension of each section being receivable within the collar of the other section by a relative longitudinal movement of said sections towards each other in the assembly of said sections, the bore aforesaid progressively decreasing in size from the center towards one end of the connecter, each of said sections having transverse grooves in the contiguous faces thereof intermediate the ends forming a transverse opening through said connecter when the sections are assembled, and a locking member adapted to be inserted in said transverse opening.

3. A connecter comprising a pair of complemental grooved sections adapted to receive therewithin the ends of members to be joined together, each section comprising a semi-cylindrical portion terminating at one end in a reduced shouldered extension and at its other end in a cylindrical collar portion adapted to receive and seat on the reduced extension of the other section whereby to establish an interengaging of the sections incident to lateral expansion thereof by the members connected thereby, the ends of said members having enlargements and the grooves of the connecter sections being reversely tapered to cause said lateral expansion when stress is applied to the members in a longitudinal direction.

4. A connecter comprising a pair of complemental grooved sections adapted to receive therewithin the ends of members to be joined together, each section comprising a semi-cylindrical portion terminating at one end in a reduced shouldered extension and at its other end in a cylindrical collar portion adapted to receive and seat on the reduced extension of the other section whereby to establish an interengaging of the sections incident to lateral expansion thereof by the members connected thereby, the ends of said members having enlargements and the grooves of the connecter sections being tapered to cause said lateral expansion when stress is applied longitudinally to the members, the reduced extensions of the sections corresponding in length to the linear dimension of the collar portion, and the two sections when assembled presenting a cylindrically shaped unit of uniform dimension throughout its length.

IRVIN STIDD.